United States Patent [19]
Haiko et al.

[11] Patent Number: 5,599,263
[45] Date of Patent: Feb. 4, 1997

[54] OIL FEED SYSTEM FOR A VARIABLE-CROWN ROLL

[75] Inventors: Risto Haiko, Jyväskylä; Ari Lehto, Leppävesi; Pekka Kivioja, Muurame, all of Finland

[73] Assignee: Valmet Corporation, Helsinki, Finland

[21] Appl. No.: 456,088

[22] Filed: May 31, 1995

[51] Int. Cl.$^6$ ........................................ B21B 13/02
[52] U.S. Cl. ........................................ 492/7; 492/60
[58] Field of Search ........................ 492/2, 5, 7, 16, 492/20, 47, 60; 100/162 B; 384/99, 100

[56] References Cited

U.S. PATENT DOCUMENTS

| | | |
|---|---|---|
| 3,997,953 | 12/1976 | Christ et al. ........................ 492/7 |
| 4,090,282 | 5/1978 | Lehman ............................. 492/7 |
| 4,106,405 | 8/1978 | Biondetti et al. . |
| 4,222,324 | 9/1980 | Biondetti . |
| 4,291,446 | 9/1981 | Marchioro .......................... 492/7 |
| 4,292,716 | 10/1981 | Marchioro . |
| 5,103,542 | 4/1992 | Niskanen . |

*Primary Examiner*—David P. Bryant
*Attorney, Agent, or Firm*—Steinberg, Raskin & Davidson, P.C.

[57] ABSTRACT

An oil feed system for a variable-crown roll which includes a stationary roll axle, a roll mantle arranged revolvingly on the roll axle and hydraulic loading elements acting upon an inner face of the roll mantle in a radial direction and supporting the roll mantle on the roll axle. The loading elements function to regulate the axial profile of the roll mantle. In the roll axle, an axial through hole is formed which communicates with cylinder bores in which the hydraulic loading elements are arranged through substantially radial bores or equivalent ducts. In the axial through hole, at least through one of the roll ends, oil feed pipes are installed and through which pipes, a pressure fluid is fed to the hydraulic loading elements. Into the axial through hole in the roll axle, at the location of the loading elements, an intermediate flange is installed, which operates as a distributor piece and is connected with the loading element. One of the oil feed pipes passes to each of the distributor pieces to which each loading element is connected so that, through the distributor piece, the pressure fluid can be passed to the loading element whereby the loading produced by means of the loading element is adjustable in the desired way.

19 Claims, 16 Drawing Sheets

OIL FEED SYSTEM FOR A VARIABLE-CROWN ROLL

BACKGROUND OF THE INVENTION

The present invention relates to an oil feed system for a variable-crown roll, which roll comprises a stationary roll axle and a roll mantle that is revolvingly arranged on the stationary roll axle and that is supported on the roll axle by means of hydraulic loading elements acting upon the inner face of the roll mantle in the radial direction. By means of the loading elements, the axial profile of the roll mantle is regulated. An axial through hole has been formed in the roll axle and communicates with cylinder bores or equivalent of the hydraulic loading elements through substantially radial bores or equivalent ducts. In the axial through hole, at least oil feed pipes are installed, at least through one of the roll ends, through which a pressure fluid is fed to the hydraulic loading elements.

In the prior art, a number of different variable-crown rolls for paper machines or paper finishing machines are known, for which rolls different designations are used, such as variable-crown roll, roll adjustable in zones. Generally, these rolls comprise a massive or tubular, stationary roll axle and a roll mantle that is arranged to revolve around the axle. Between the axle and the mantle, glide-shoe arrangements that act upon the inner face of the mantle and/or a chamber or series of chambers for pressure fluid are arranged such that the axial profile of the mantle at the nip can be aligned or adjusted in a desired manner, e.g., to a desired profile.

In variable-crown rolls, a complex oil distribution system is needed because the roll has a number of points to which oil must be passed. These points include the zones in a variable-crown roll, to which pressure fluid must be passed, various points that require lubrication, to which a lubricant is passed, possible roll heating means for the supply of heating fluid, and equivalent objects that consume oil. Since a roll has a number of various oil-consuming objects, the roll must, of course, also include a system of ducts for the exhaust oil. In the prior art, the system of oil distribution ducts has been accomplished in a variable-crown roll in a number of different alternative ways.

One prior art construction is described, e.g., in U.S. Pat. No. 4,222,324, in which a separate axial bore is formed into the roll axle of the variable-crown roll for each zone in the variable-crown roll, through which bores the oil is passed into the zones through radial bores. Thus, in such a roll, it is necessary to make a considerable amount of bores and various pipe systems. This results in the drawback that the cost of manufacture of the system of oil distribution ducts is quite high, and the system of ducts requires very careful manufacture, for various rubbish, dirt, machining chips and equivalent readily remain in the ducts. Moreover, for possible heating and lubrication of the roll, it has been necessary to form the required bores into the roll axle, or it has been necessary to provide the roll with a specific separate system of ducts for these functions.

A second prior art construction is described, e.g., in U.S. Pat. No. 4,292,716, wherein the roll has an axial bore having a large diameter formed into the roll axle, in which bore a series of pipes is arranged. Through the pipes, the pressure fluid is passed to the hydrostatic loading elements placed in the zones of the roll. The series of pipes is connected with a number of sealing elements by whose means the series of pipes is sealed in relation to the axial bore of the roll between the zones. It is a significant drawback of this arrangement that the series of pipes comprises a number of sealing points and, thus, it comprises a number of seals which are susceptible to leakage. Moreover, the pipes included in the series of pipes must be of very high quality to withstand the pressures required by the zones. A further problem in this construction is involved in the seal friction. It also results from these drawbacks that, for example, the construction is very expensive and complicated to manufacture. Also, in such a construction, separate systems of ducts are required, for example, for possible heating of the roll and for the points to be lubricated. Furthermore, if the zones in the roll were to be made more frequent, these problems would be emphasized further, as the number of objects to be sealed would increase accordingly.

A further prior art construction is described, e.g., in U.S. Pat. No. 4,106,405. In the construction disclosed in this patent, a central hole having a large diameter is formed into the roll axle. Coaxially arranged pipes are arranged in the hole and through which the pressure fluid is fed into the zones of the roll. This construction also involves a number of different drawbacks, of which it should be mentioned, for example, that the wall thicknesses of the pipes must be large, because the pressures required by adjacent zones may differ from one another quite substantially. Thus, the risk of buckling of the pipes is quite high. Also, the sealing of the pipes is quite problematic in this construction, for the pipes must be sealed in relation to one another, on one hand, and they must be sealed in relation to the central hole formed into the roll axle, on the other hand. From the point of view of the manufacture of this roll, such an oil distribution system is complicated and expensive. Also in this system, for possible heating of the roll, the roll must be provided with a separate fluid distribution system.

Another prior art construction is described in U.S. Pat. No. 5,103,542. In the construction disclosed in this patent, a system of oil distribution ducts in the roll is composed of one profile, which is arranged in an axial hole formed into the roll axle. It is an advantage of this profile construction that, if necessary, the profile may include ducts for the pressure fluid passing into the zones, lubricant ducts, an exhaust oil duct, and in addition, a system of ducts for heating fluid. Indeed, such a construction is quite advantageous when the distribution of zones in the roll is not so dense, i.e., when the number of zones in the roll is not high. However, on the other hand, in a case in which the number of zones must be increased, this construction involves the drawbacks that are related to the fact that the number of points to be sealed becomes higher. Thus, when the profile construction is employed, the number of ducts is quite limited. Owing to the large number of seals and the small plays, the installation of the profile into the roll axle is quite difficult, especially when the number of zones is high. In order that an adequate sealing quality of the seals of the profile could be secured, it has been necessary to hone the central hole in the axle.

OBJECTS AND SUMMARY OF THE INVENTION

Accordingly, it is an object of the present invention to provide an improved oil feed system for a variable-crown roll, by means of which system many of the drawbacks described above and related to the prior art are avoided.

In view of achieving the object stated above, and others, in the invention, an intermediate flange or equivalent is installed in an axial through hole in the roll axle at the location of the loading elements. The intermediate flange operates as a distributor piece and is connected with the loading element, and more particularly, with the oil feed pipe passing to the loading element so that, through the distributor piece, the pressure fluid is passed to the loading element, whereby the loading produced by means of the loading element is adjustable in the desired manner.

It is an important advantage of the present invention with respect to the prior art constructions that the invention makes it possible that, if necessary, oil of the desired pressure can be fed into each of the loading elements in the roll. At present, when it is desirable to achieve more and more precise profiling by means of a variable-crown roll, the aim is that it should be possible to feed the desired adjustable pressure into each loading element in the roll. However, by means of the prior art constructions described above, this has not been possible, at least not by simple means.

The present invention also provides a number of other advantages, of which the following should be mentioned. The oil feed system in accordance with the invention has a very high resistance to pressure (of an order higher than about 100 bars) with a low wall thickness of the ducts. In the oil feed system in accordance with the invention, circular large ducts are employed, which results in low flow losses. The number of ducts can be increased quite readily. Owing to the construction, the sealing can be carried out by means of ordinary O-rings, in which case the use of more expensive piston seals is avoided. Owing to the above, the installation of the oil feed system in rolls is easy, since the construction does not involve high seal friction, and the manufacture of the roll axle is quicker, because the central hole does not have to be honed and the bores passing into the central hole need not be rounded. Further, for the central hole in the roll axle, larger dimensional deviations are permitted than in the prior art.

Further advantages and characteristic features of the invention will come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
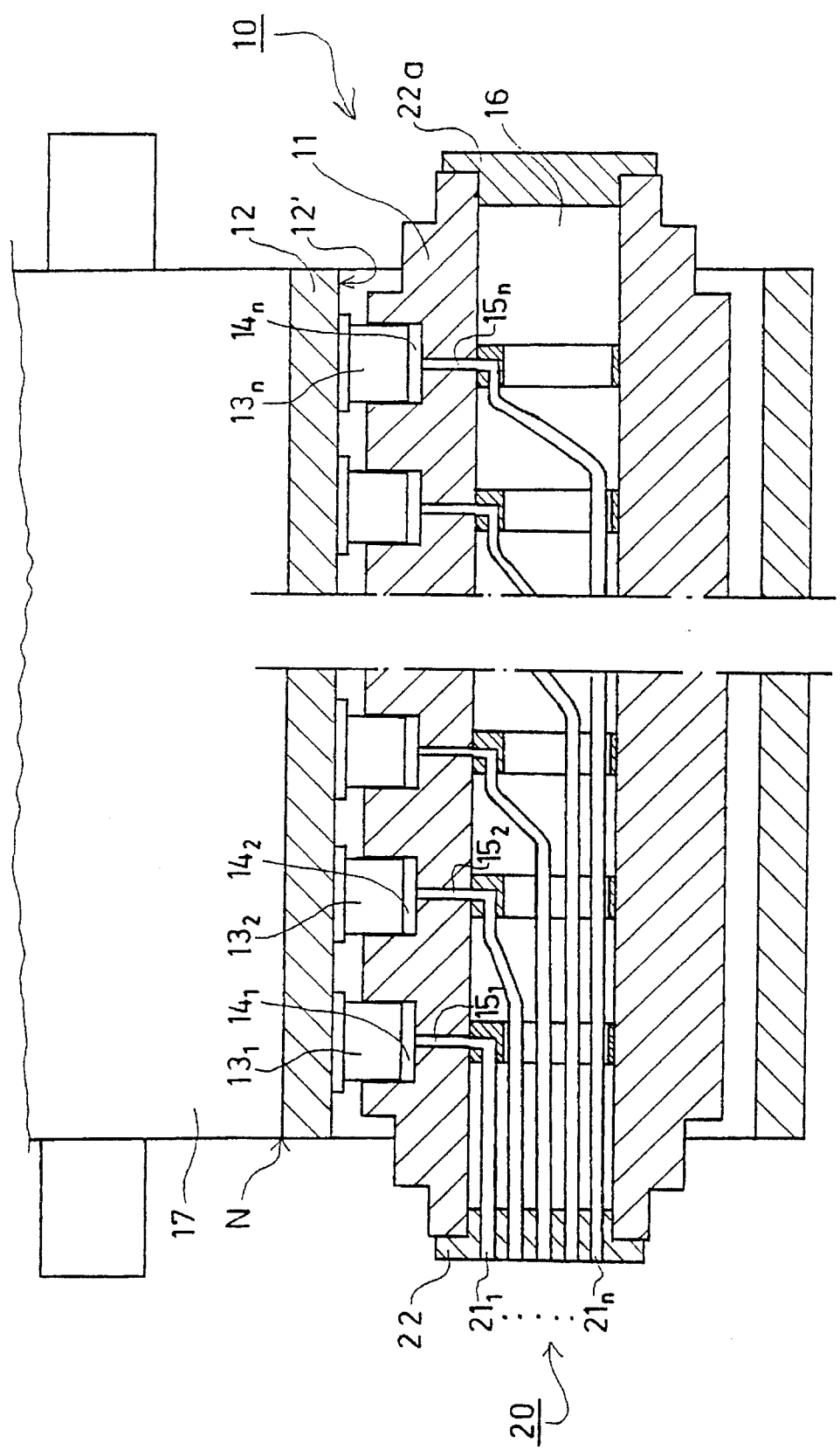
FIG. 1 is a longitudinal sectional view of a variable-crown roll that is provided with an oil distribution or feed system in accordance with the invention.

Referring to the accompanying drawings wherein like reference numerals refer to the same or similar elements, in FIG. 1, a variable-crown roll in accordance with the invention is denoted generally with reference numeral 10. The roll 10 comprises a roll axle 11 and a roll mantle 12 which is revolvingly arranged on the axle 11. As shown in FIG. 1, the roll 10 is a so-called nip roll, i.e., it forms a nip N with a back-up roll 17. Between the roll axle 11 and the roll mantle 12, loading elements $13_1, \ldots 13_n$ are arranged. The loading elements act upon an inner face 12' of the roll mantle 12 and operate to load the roll mantle 12 in the nip plane (the plane defined between the central axes of the back-up roll 17 and the roll 10) so as to regulate the axial profile of the roll mantle in the desired manner. The loading elements $13_1, \ldots, 13_n$ are arranged to be movable in a radial direction in radial cylinder bores $14_1, \ldots, 14_n$ formed in the roll axle 11. Further, the roll 10 as shown in FIG. 1 is a so-called variable-crown roll adjustable in zones, which means that each of the loading elements $13_1, \ldots, 13_n$ in the roll 10 forms a zone of its own whereby each loading element is individually regulated.

A through hole 16 is formed in the roll axle 11 and extends substantially axially from one end of the roll to the other end of the roll. In the axial hole 16, which is also referred to as a central hole since its central axis substantially coincides with a central axis of the roll 10, an oil feed system in accordance with the invention, denoted generally with the reference numeral 20 in FIG. 1, is installed. Generally, the system 20 of oil feed ducts comprises an oil feed pipe $21_1, \ldots, 21_n$ passing through the end flange 22 to each loading element $13_1, \ldots, 13_n$. Each of the oil feed pipes is connected to a radial bore $15_1, \ldots, 15_n$ passing to each loading element $13_1, \ldots, 13_n$. The end flange 22a at the opposite end of the roll axle 11 is solid and is shown schematically.

If the number of the loading elements $13_1, \ldots, 13_n$ in the variable-crown roll 10 is so high that the pipes $21_1, \ldots, 21_n$ passing to all of the loading elements cannot be fitted in the same central hole 16, the feed of oil to the loading elements $13_1, \ldots, 13_n$ can be divided into two parts. As such, the oil is fed from both ends of the roll to the loading elements placed at different sides of the center line of the roll 10. Then, of course, at each end of the roll 10 axle 11, an end flange 22 similar to that shown in FIG. 1 at the left end of the roll is used, in which case the oil feed and the feed pipes $21_1, \ldots, 21_n$, respectively, are passed into the roll through both of the roll ends.

Figure 2:
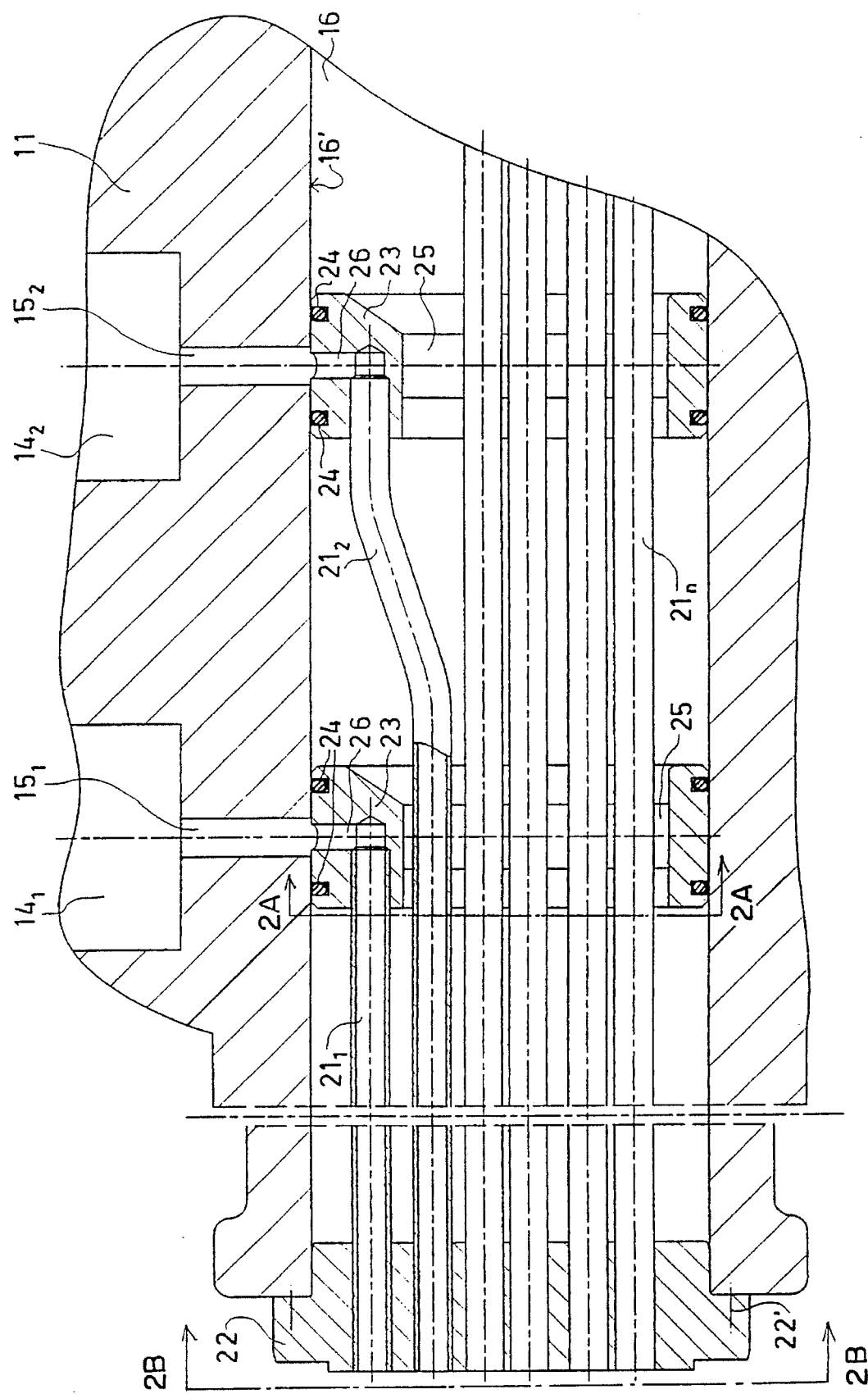
FIG. 2 is an illustration on a larger scale of a first embodiment of the oil feed system in accordance with the invention.

FIG. 2 shows an embodiment of the oil feed system in accordance with the invention. As in FIG. 1, the roll axle is denoted by reference numeral 11, the axial through central hole is denoted by reference numeral 16, the radial cylinder bores of the loading elements are denoted by reference numerals $14_1$ and $14_2$, the radial bores extending from the cylinder bores into the central hole 16 are denoted by reference numerals $15_1$ and $15_2$, the oil feed pipes with the reference numerals $21_1 \ldots 21_n$, and the end flange through which the oil feed pipes are passed into the roll is denoted by reference numeral 22. Further, FIG. 2 schematically shows fastening means, such as fastening screws 22', by whose means the end flange 22 is attached to the end of the roll axle 11. Regarding the end flange 22, reference is made further to FIG. 2B, in which the end flange 22 is shown as an illustration taken along the line 2B—2B in FIG. 2. In FIG. 2B, reference numeral 22' refers to the holes passing through the end flange 22 into which the fastening screws 22' are inserted.

As shown in FIG. 2, at the location of each radial cylinder bore $14_1, 14_2$ formed in the roll axle 11, into the central hole 16 in the axle, a distributor piece 23 for the oil feed system, also referred to as an intermediate flange, is installed. Through the intermediate flange 23, the pressure fluid is passed to each loading element. Regarding the intermediate flange 23, reference is made additionally to FIG. 2A, which shows the intermediate flange as an illustration taken along the line 2A—2A in FIG. 2. A radial bore 26 is formed in the intermediate flange 23 and has closed bottom and opens into the radial bore $15_1, 15_2$ passing into the respective cylinder bore $14_1, 14_2$ formed in the roll axle 11. Further, an axial bore 27 is formed in the distributor piece or intermediate flange 23 and has a closed bottom and which is connected with the radial bore 26. To the axial bore 27, in each particular case, the feed pipe $21_1, 21_2$ of the oil feed system is connected through which the pressure fluid is fed into the loading element at which the intermediate flange 23 concerned is placed. In the embodiment of FIG. 2, the joint between the feed pipes $21_1, 21_2$ and the intermediate flange or distributor piece 23 is fixed.

Figure 2A:
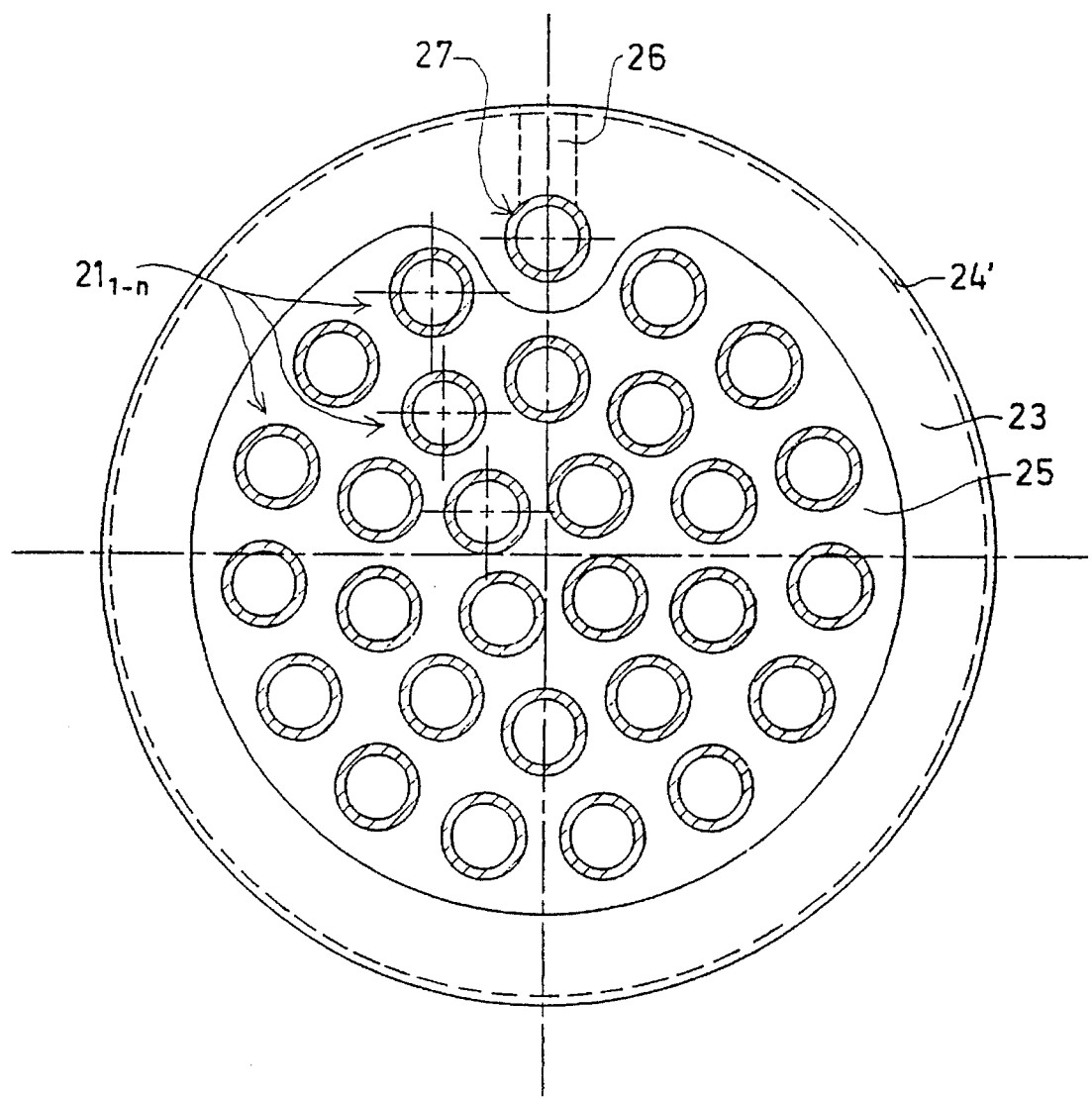
FIG. 2A is an illustration of a distributor piece of the oil feed system viewed along the line 2A—2A in FIG. 2.
Figure 2B:
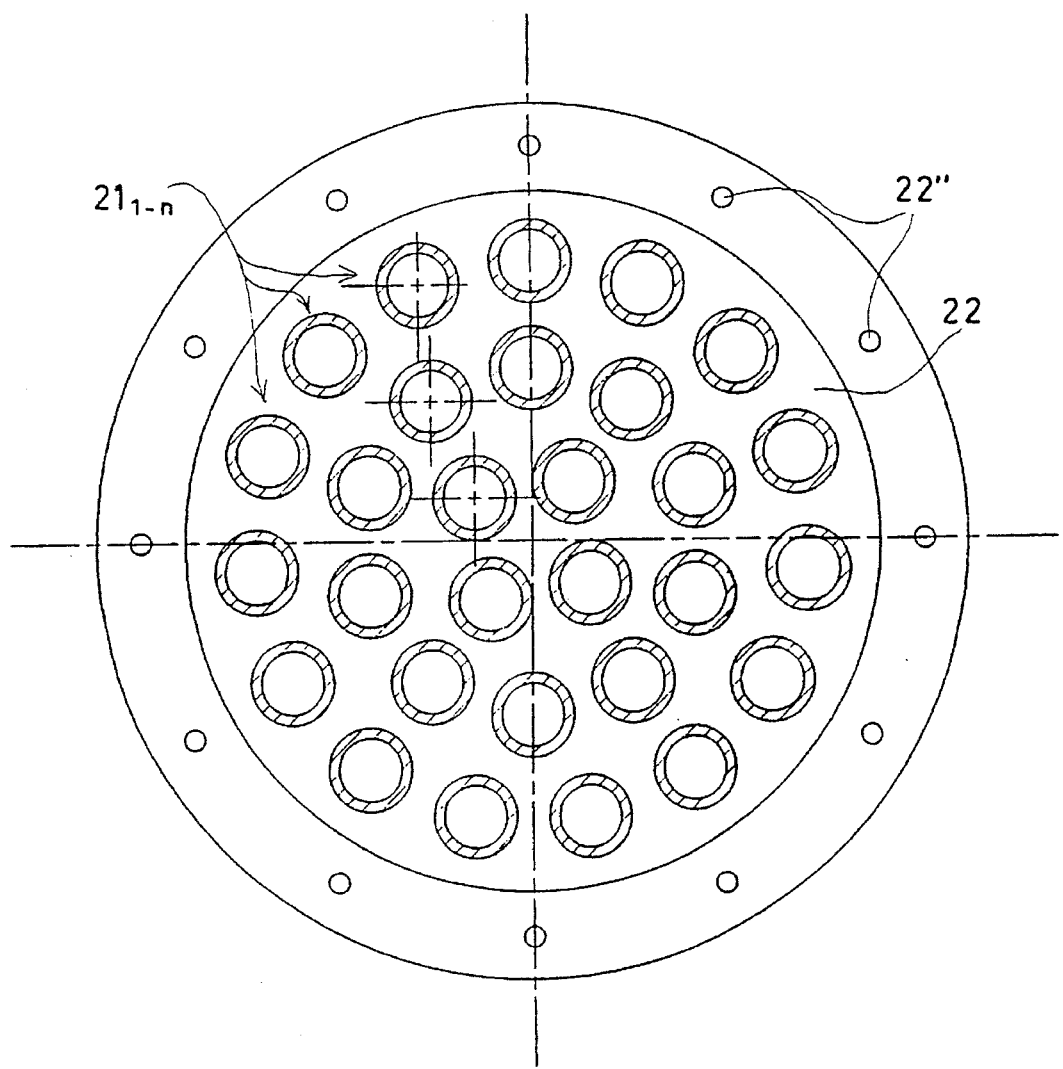
FIG. 2B shows the end flange of the oil feed system viewed along the line 2B—2B in FIG. 2.

As seen clearly in FIGS. 2 and 2A, the intermediate flange 23 is substantially annular so that therein, there is a large through hole 25 through which the pressure fluid feed pipes passing to the other loading elements are passed. As stated earlier, in the embodiment of FIG. 2, the joint between the oil feed pipes $21_1, \ldots, 21_n$ and the corresponding intermediate flange 23 is fixed, so that the joint is also tight and does not require additional sealing. In the other respects, in the embodiment of FIG. 2, the sealing is arranged so that annular grooves 24' are formed in the outer face of each intermediate flange 23 at both sides of the radial bore 26. In the annular grooves 24', O-ring seals 24 are arranged which seal the intermediate flange 23 against the inner face 16' of the central hole 16 formed in the roll axle 11. Thus, at each loading element and each cylinder bore $14_1, 14_2$, respectively, the sealing is arranged by means of two O-rings 24, and the feed of oil does not require any other seals. Thus, the intermediate flanges 23 are not fixed rigidly to the central hole 16, but they are allowed to "live" or adjust slightly, for example, because of thermal expansion. This is, however, no substantial drawback, for partly the thermal expansion is absorbed and taken into account by the oil feed pipes $21_1, \ldots, 21_n$, because the oil feed pipes that pass to intermediate flanges 23 placed more distant from the end flange 22, at which pipes the effect of thermal expansion is largest, must perform a greater extent of bending, so that these bends absorb thermal expansion. The oil feed pipes passing to intermediate flanges 23 placed close to the end flange 22 are shorter, in which case the thermal expansion is not a significant drawback.

Figure 3A:
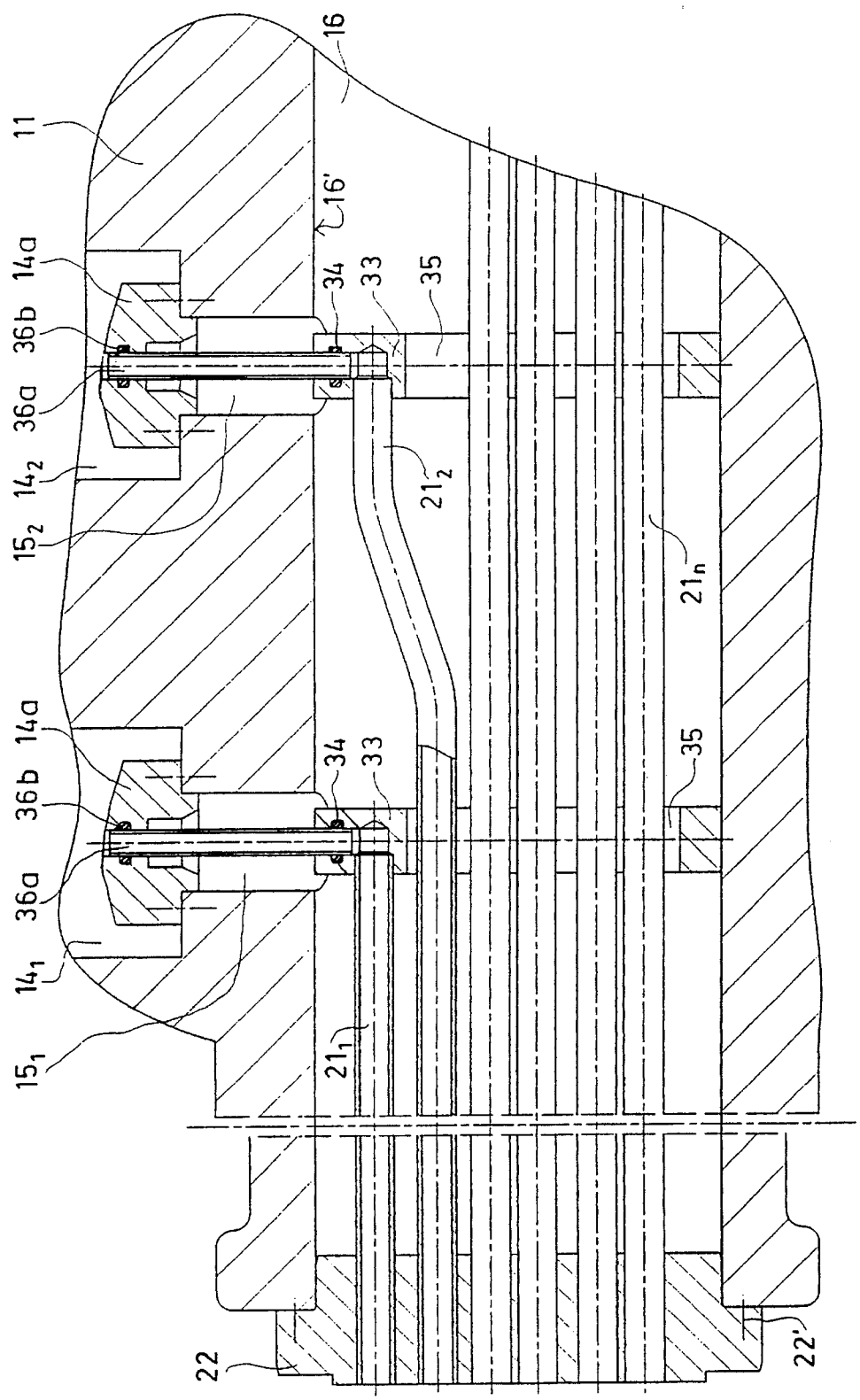
FIGS. 3A and 3B are illustrations corresponding to FIG. 2 of alternative embodiments of the oil feed system in accordance with the invention.
Figure 3B:
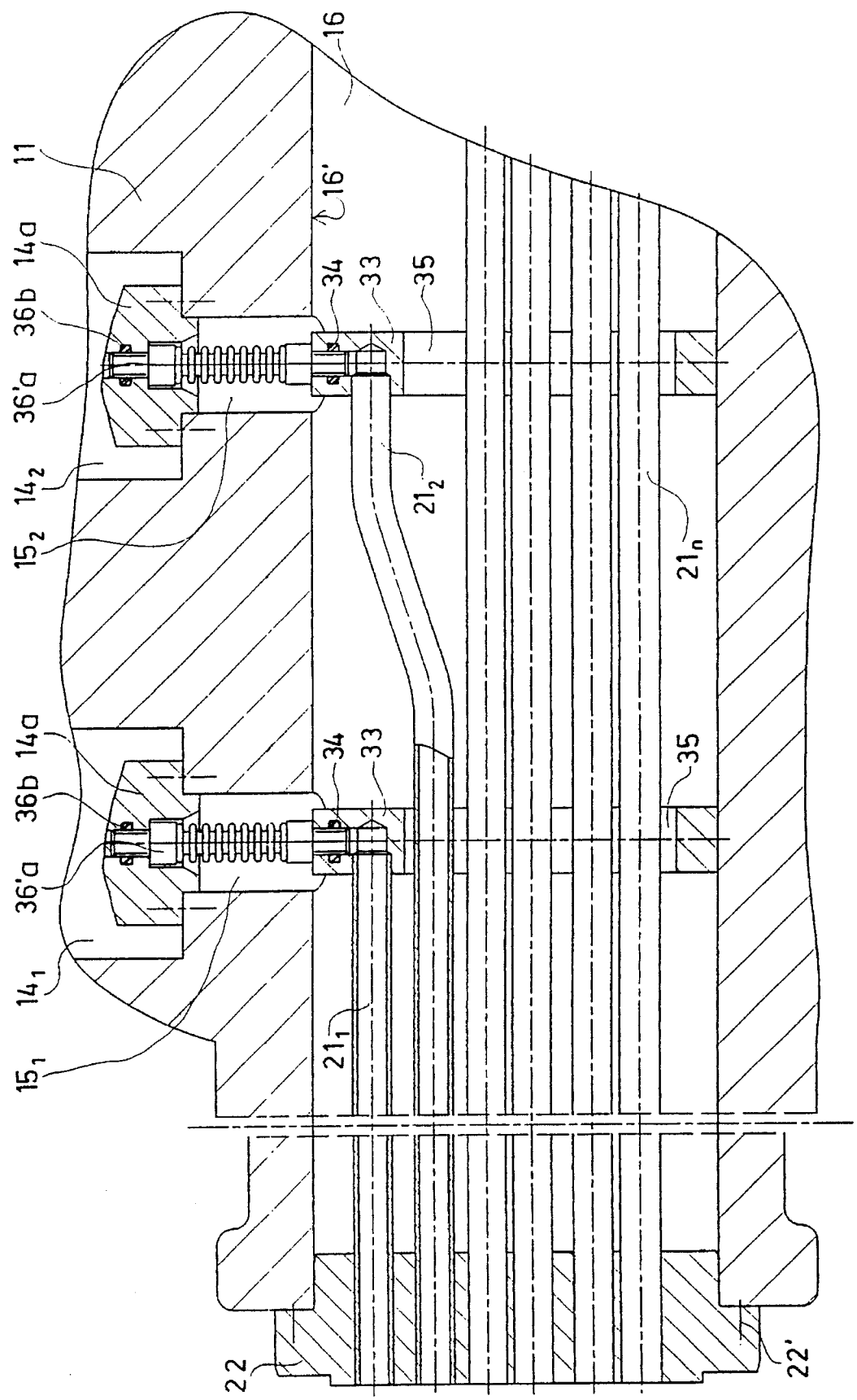
Figure 3C:
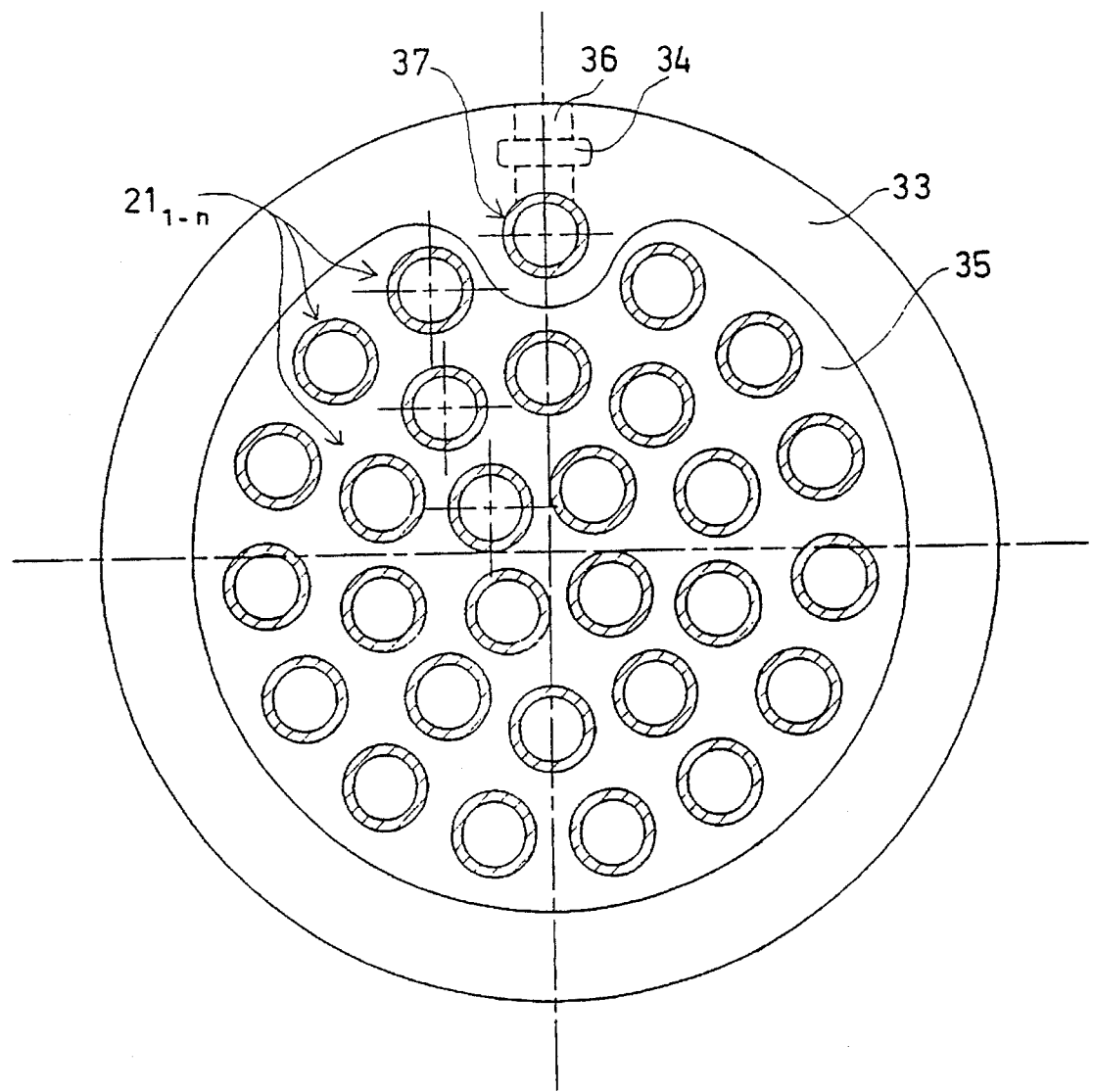
FIG. 3C is an illustration corresponding to FIG. 2A of the distributor piece in a system of oil supply ducts as shown in FIGS. 3A and 3B.
Figure 4:
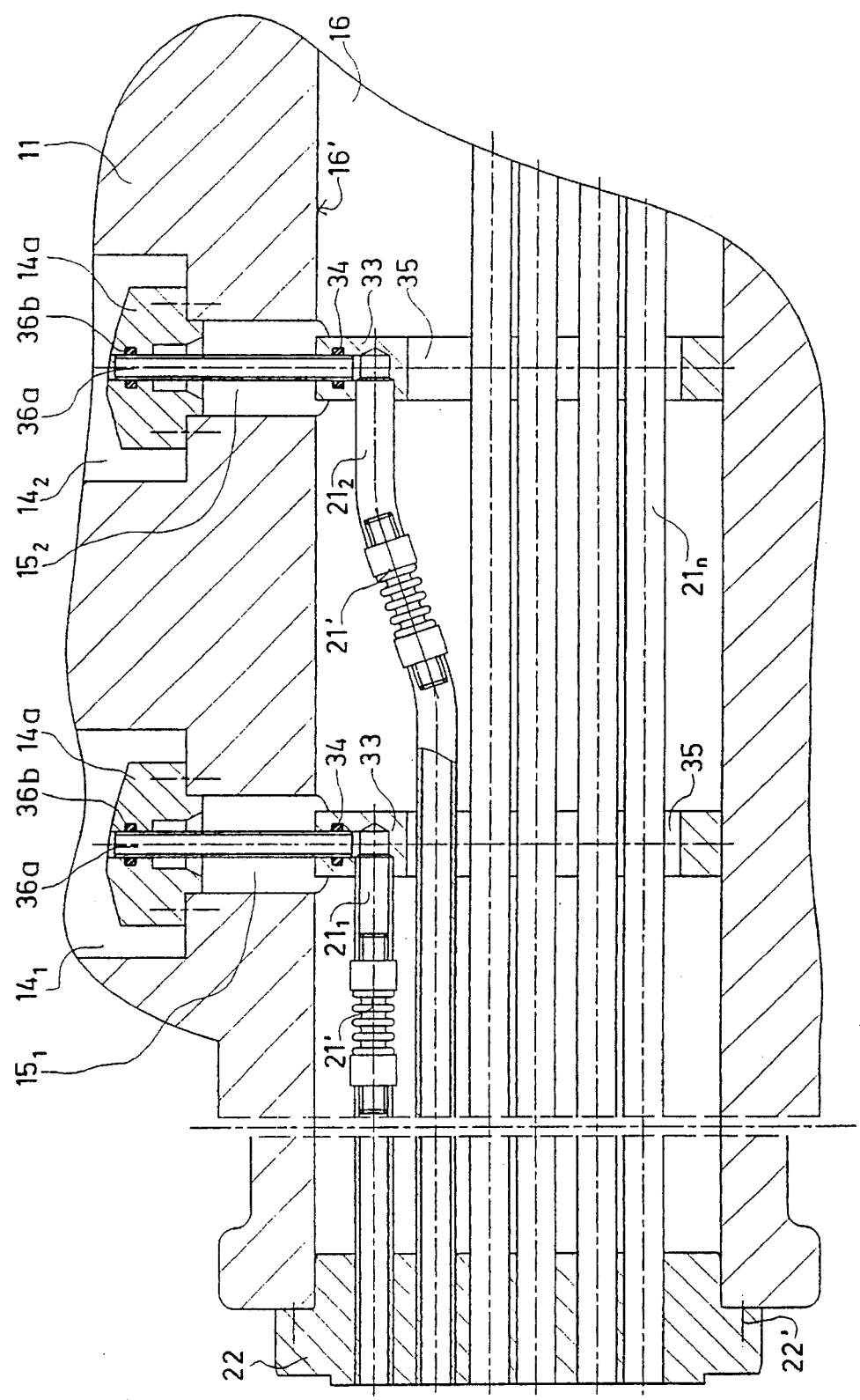
FIG. 4 shows a further embodiment of the oil feed system in accordance with the invention.

FIGS. 3A, 3B and 4 illustrate some alternative embodiments of the modes in which the feed of oil can be accomplished and how thermal expansion can be taken into account in the oil feed system in accordance with the invention, and FIG. 3C shows an intermediate flange that is used in connection with the embodiments of FIGS. 3A, 3B and 4. These embodiments will be described below in the respects in which they differ from the earlier description, so that, in a corresponding manner, regarding similarities, reference is made to the description given above. The oil feed pipes $21_1, \ldots, 21_n$ are passed into the roll through the end flange 22 in a manner similar to that described above, so that each feed pipe in its turn communicates with the respective loading element by the intermediate of the distributor piece, i.e., the intermediate flange, which is denoted by reference numeral 33 in FIGS. 3A, 3B, 3C and 4. The intermediate flange 33 is annular, as comes out clearly from FIG. 3C, and comprises a large through opening 35. Into the intermediate flange 33, also similar to that described in the embodiment of FIG. 2, an axial bore 37 is formed so that, in each particular case, one of the feed pipes $21_1, \ldots, 21_n$ can be connected to the intermediate flange 33 operating as the distributor piece and placed at the location of the loading element. The joint between the feed pipe concerned and the intermediate flange 33 is fixed, as is also the case in the embodiment of FIG. 2. Further, into the intermediate flange 33, a radial bore 36 is formed in a manner corresponding to FIG. 2, which bore 36 communicates with the axial bore 37.

In the embodiments of FIGS. 3A, 3B and 4, a large radial bore $15_1, 15_2$ is formed in the bottom portion of the cylinder bores $14_1, 14_2$ and communicates with the central hole 16 in the axle 11 in each particular case, and further on the bottom portion of the cylinder bores $14_1, 14_2$, a support piece 14a is installed which covers the radial bore $15_1, 15_2$. In the exemplifying embodiment of FIG. 3A, an intermediate pipe 36a is fixed as sealed into this support piece 14a, the opposite end of the pipe 36a being installed in the radial bore 36 in the intermediate flange 33 as sealed, the sealing being carried out by means of an O-ring seal 34. Against the support piece 14a, the intermediate pipe 36a is also sealed by means of an O-ring seal 36b. In the embodiment of FIG. 3A, the intermediate pipe 36a, which operates as a duct between the cylinder bore $14_1, 14_2$ and the flange 33, is a rigid duct. Such a construction can be used in particular in cases in which no extensive thermal expansion is expected. Minor thermal expansion can also be received by the construction shown in FIG. 3A, for the exemplifying embodiment of FIG. 3A permits slight axial movements of the intermediate flanges 33 in the central hole 16 in the roll axle 11. As seen in FIG. 3A, in this exemplifying embodiment, the intermediate flanges 33 do not require sealing against the inner face 16' of the central hole.

The embodiment shown in FIG. 3B differs from the embodiment described in FIG. 3A in the respect that, in the case of FIG. 3B, a resilient duct is used as the intermediate pipe 36'a which, in each particular case, connects the intermediate flange 33 with the cylinder bore $14_1, 14_2$. Thus, the embodiment of FIG. 3B permits considerable axial movements of the intermediate flanges 33 resulting from thermal expansion. If the movement of the intermediate flanges 33 resulting from thermal expansion is remarkably large, of course the radial bores $15_1, 15_2$ must be sufficiently large in order that this movement could be possible. The exemplifying embodiment of FIG. 3B can be used expressly in cases in which large movements arising from thermal expansion are expected.

In respect of the connection between the intermediate flanges 33 and the cylinder bores $14_1, 14_2$, the embodiment of FIG. 4 is similar to that described in relation to FIG. 3A.

Thus, in the embodiment of FIG. 4, similarly a rigid intermediate pipe 36a is used, which is sealed by means of the seals 34,36b against the support piece 14a, on one hand, and against the intermediate flange 33, on the other hand. In the embodiment of FIG. 4, a resilience that takes into account, for example, thermal expansion is arranged in the substantially horizontal feed pipes $21_1, \ldots, 21_n$ so that, in each feed pipe $21_1, \ldots, 21_n$, a resilient intermediate piece 21' is installed. In the exemplifying embodiment of FIG. 4, possible thermal expansion does not shift the intermediate flanges 33 from their positions shown in the figure, but the increased and reduced lengths of the feed pipes $21_1, \ldots, 21_n$ arising from thermal expansion are received by means of the resilient intermediate pieces 21'. Thus, the exemplifying embodiment of FIG. 4 is also well suitable for use in cases in which high variations of temperature are to be expected.

Figure 5A:
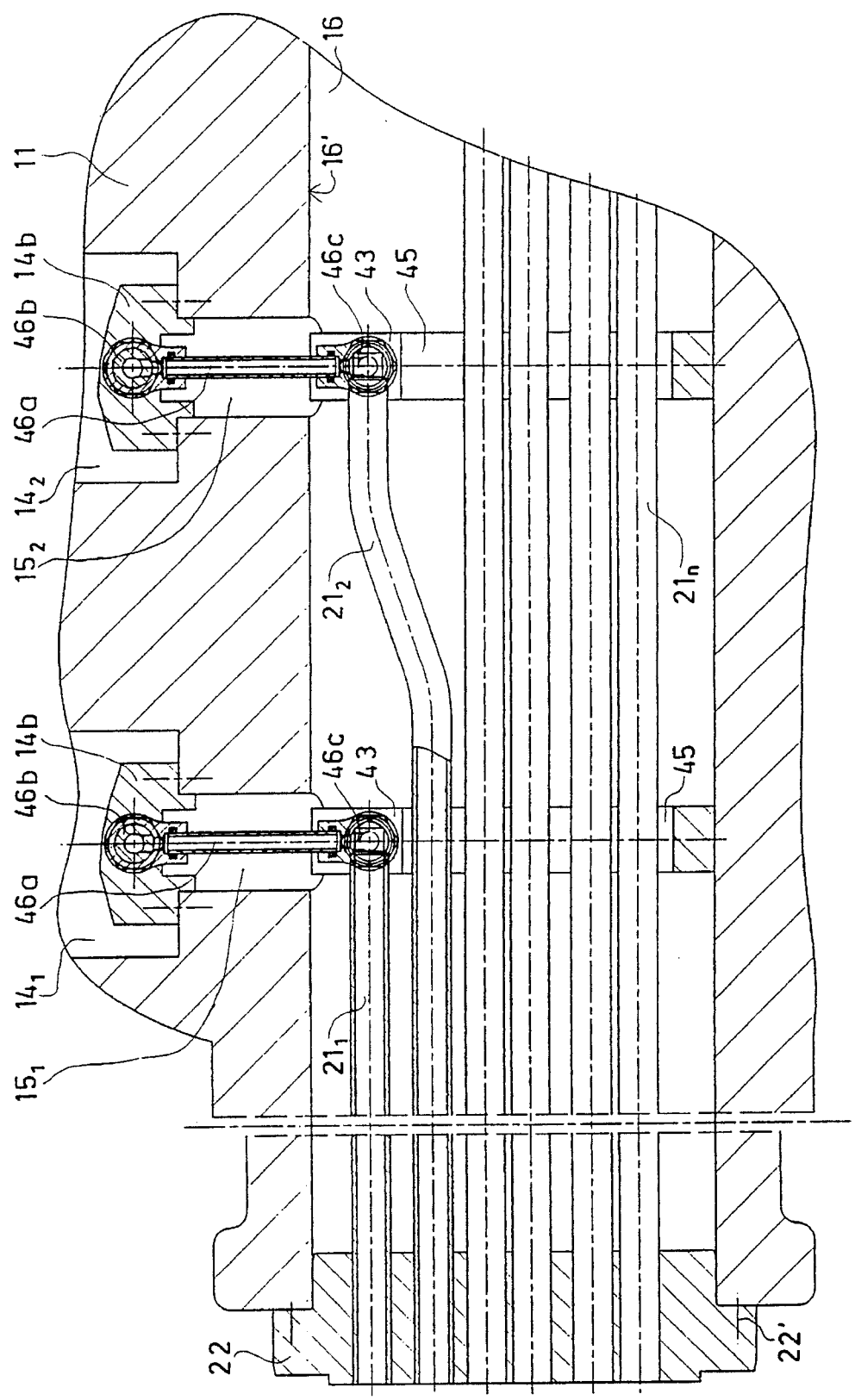
FIG. 5A is an illustration corresponding to FIG. 2 of a further embodiment of the invention.
Figure 5B:
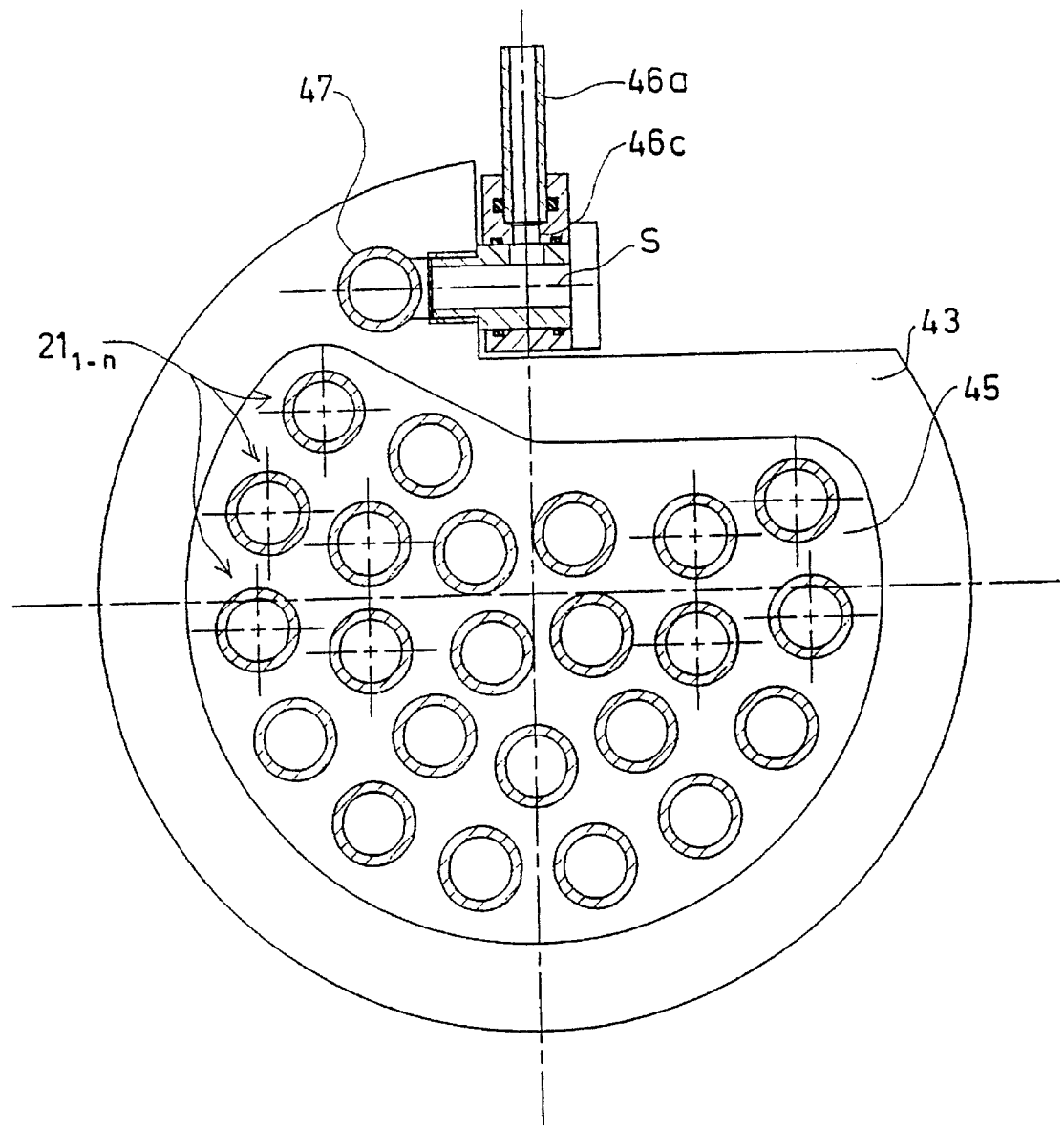
FIG. 5B is an illustration corresponding to FIG. 2A of the distributor piece of the oil feed system shown in FIG. 5A.

The embodiments of FIGS. 5A, 5B and 6A, 6B are meant in particular for cases in which, for example owing to thermal expansion, substantial changes can be expected in the lengths of the feed pipes $21_1, \ldots, 21_n$, in which case the intermediate flange, which is placed at the location of each cylinder bore $14_1,14_2$ and which operates as a distributor piece, must be able to move in the axial direction. In FIGS. 5A and 5B, the intermediate flange is denoted by reference numeral 43, and in FIGS. 6A and 6B the intermediate flange is denoted by reference numeral 53, respectively. The intermediate flanges 43,53 themselves are provided with axial bores 47,57, to which one of the feed pipes $21_1, \ldots, 21_n$ is connected in each particular case. In the exemplifying embodiments now concerned, the joint between the feed pipe and the intermediate flange is rigid and tight. The intermediate flanges are still substantially annular and comprise a large opening 45,55, through which the other feed pipes can pass.

Figure 6A:
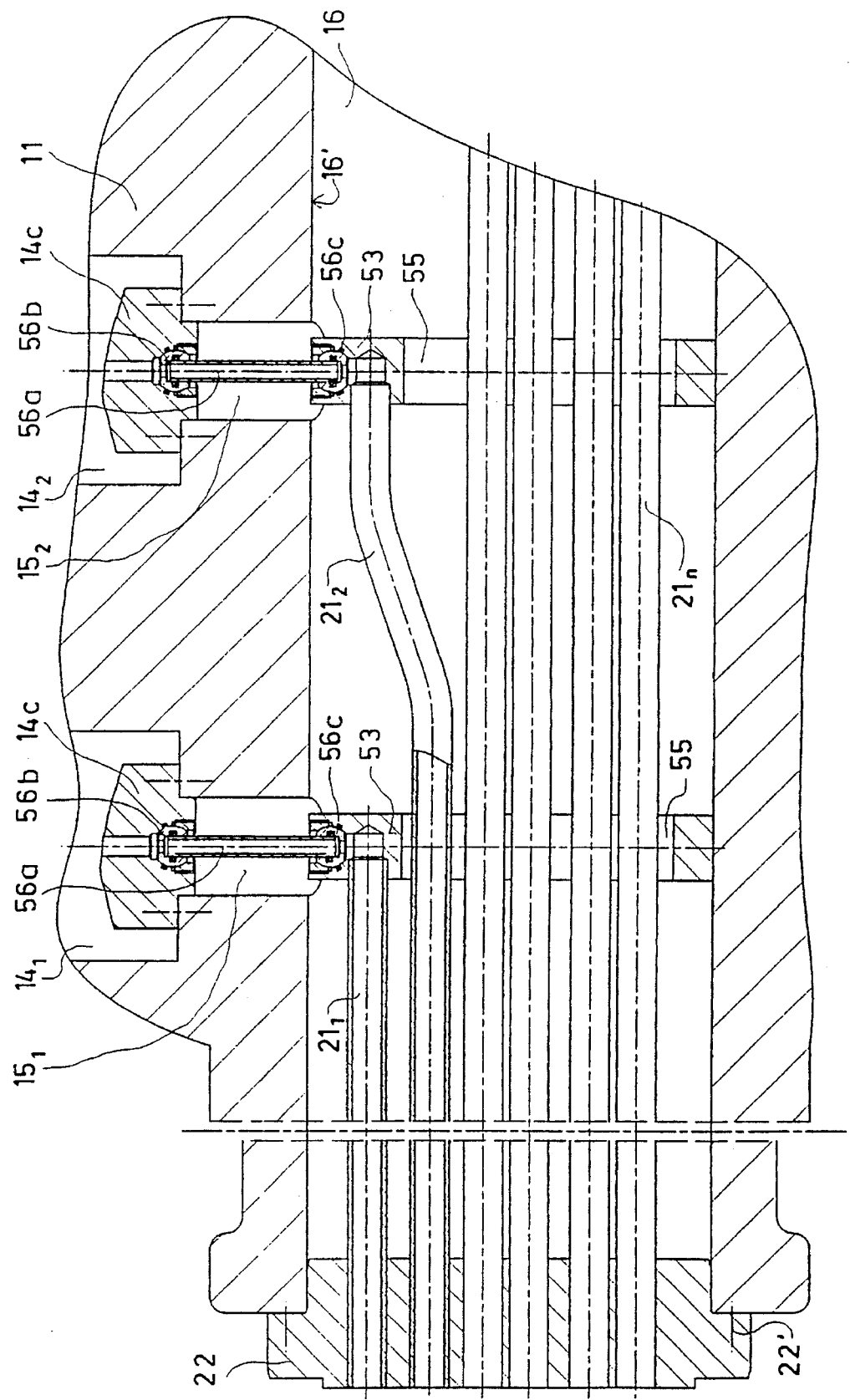
FIG. 6A is a further embodiment of the oil feed system, while the illustration corresponds to FIG. 5A.

In the exemplifying embodiments of FIGS. 5A and 6A, into the bottoms of the cylinder bores $14_1, 14_2$, large-diameter radial bores $15_1,15_2$ are formed which connect the cylinder bores $14_1,14_2$ with the central hole 16 formed in the roll axle 11. On the radial bore $15_1,15_2$, on the bottom of the cylinder bore $14_1,14_2$, in each exemplifying embodiment, a support piece 14b,14c is installed. Between the support piece 14b,14c and the intermediate flange 43,53, an intermediate pipe 46a,56a is installed to connect them and through which pipe, the pressure fluid is passed into the cylinder bores $14_1,14_2$. The intermediate pipe 46a,56a is a rigid duct both in the embodiment of FIG. 5A and in the embodiment of FIG. 6A. As stated above, the embodiments of FIGS. 5A and 6A are meant in particular for cases in which large changes in the lengths of the feed pipes $21_1, \ldots, 21_n$ is expected because of temperature. In the exemplifying embodiments of FIGS. 5A and 6A, these changes in length are taken into account so that, in each case, the joints between the intermediate pipe 46a,56a and the intermediate flange 43,53, on one hand, and the support piece 14b,14c, on the other hand, are articulated.

In the constructions shown in FIGS. 5A and 5B, the intermediate pipe 46a is connected with the intermediate flange by means of an articulated pipe joint 46c which permits pivoting of the intermediate pipe 46a in relation to the intermediate flange 43 around the axis S, which is substantially perpendicular to the roll axle and, on the other hand, to the intermediate pipe 46a. A similar articulated pipe joint 46b is also arranged in the support piece 14b, so that the pivot axis of the articulated pipe joint 46b is parallel to the pivot axis of the articulated pipe joint 46c. Thus, when temperatures cause changes in length in the feed pipes $21_1, \ldots, 21_n$, the intermediate flanges 43 can move freely in the axial direction in the central hole 16 in the roll axle 11 because the articulated pipe joints 46b,46c permit axial movement of the intermediate flanges 43.

Figure 6B:
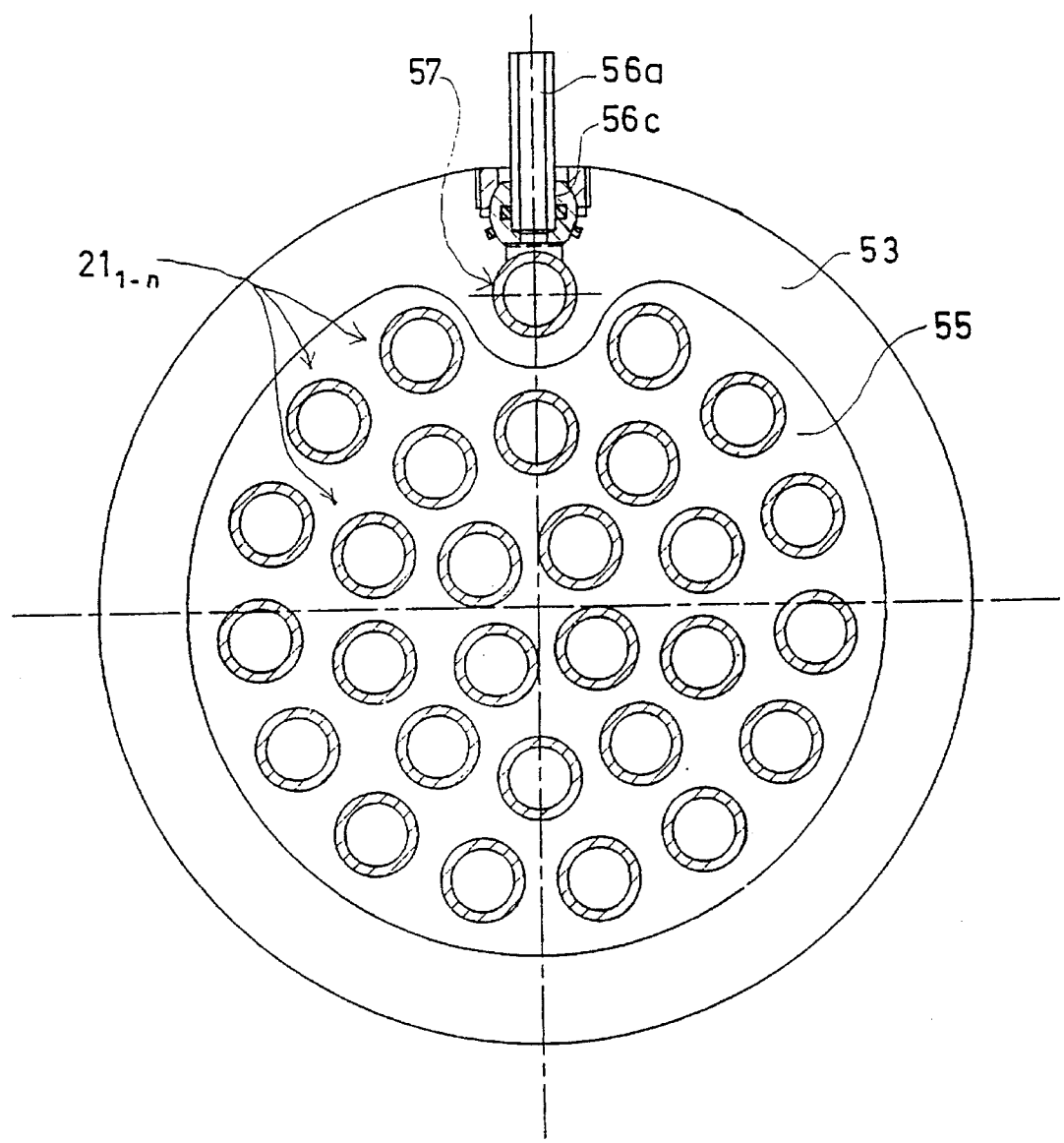
FIG. 6B is an illustration corresponding to FIG. 5B of the distributor piece of the oil feed system shown in FIG. 6A.

The embodiment of FIGS. 6A and 6B is similar to the embodiment shown in FIGS. 5A and 5B, so that, also in this embodiment, both the intermediate flange 53 and the support piece 14c are provided with articulated pipe joints 56b,56c, to which the intermediate pipe 56a is connected. However, compared with the exemplifying embodiment shown in FIGS. 5A and 5B, it is a difference that, in the embodiment of FIGS. 6A and 6B, the articulated pipe joints consist of spherical joints 56b,56c. Spherical joints permit freer movements, but one of their drawbacks is the high cost of the construction.

Figure 7:
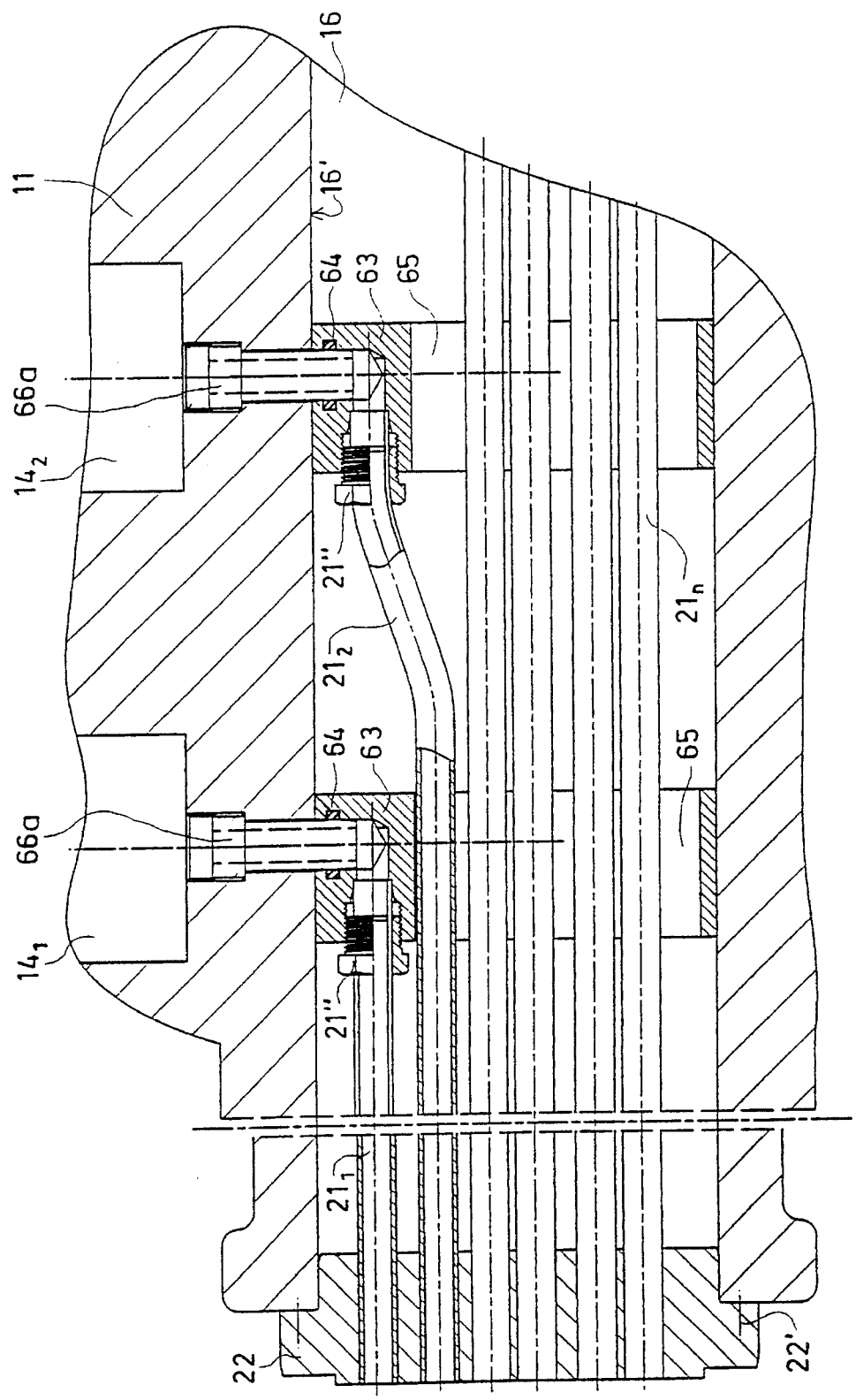
FIGS. 7 and 8 are further embodiments of the oil feed system in accordance with the invention as an illustration corresponding to FIG. 2.

In FIG. 7, an embodiment of the invention is shown in which it is an important feature that, in each particular case, the feed pipes $21_1, \ldots, 21_n$ are connected rigidly with the intermediate flanges operating as distributor pieces, which flanges are denoted by reference numeral 63, so that, in particular in the case of FIG. 7, in the joints between the feed pipes and the intermediate flanges 63, screw joints 21'' are used. In FIG. 7, the opening in the annular intermediate flange is denoted by reference numeral 65. On the other hand, it is another important feature of the embodiment of FIG. 7 that axial movement of the intermediate flanges 63 in the central hole 16 in the roll axle is also prevented. According to FIG. 7, this is accomplished so that, in the radial bore formed in the bottom of the cylinder bores $14_1,14_2$, an intermediate pipe 66a is arranged which, at the same time, locks the intermediate flange in its position as it is substantially coextensive with the fluid passage in the intermediate flange 63. The intermediate pipe 66a is additionally sealed against the intermediate flange 63 by means of a ring seal 64. The intermediate pipe 66a may be attached to the roll axle 11, for example, by means of a threaded joint. Thus, the embodiment as shown in FIG. 7 does not permit very large changes in length in the feed pipes $21_1, \ldots, 21_n$.

Figure 8:
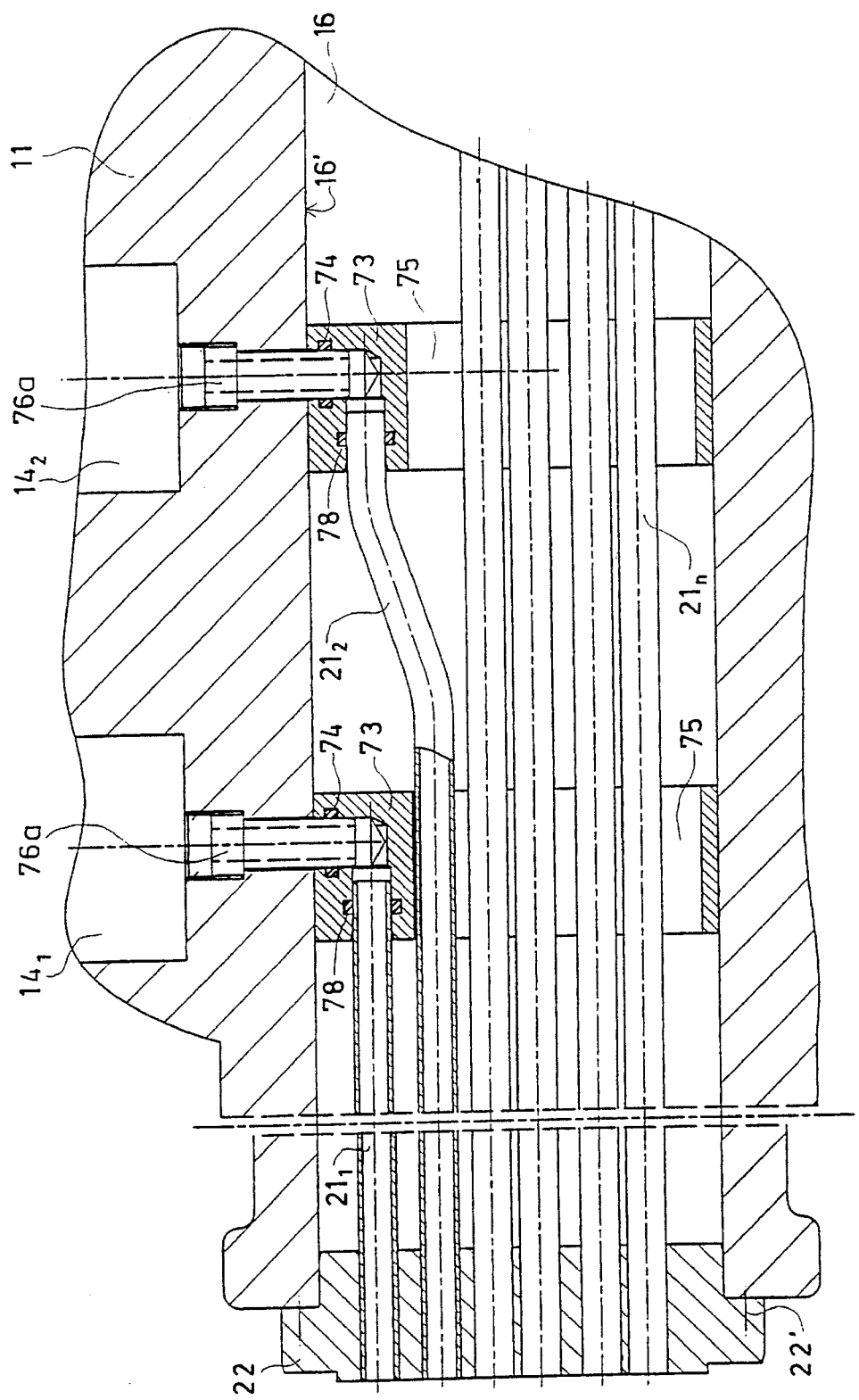

In the exemplifying embodiment of FIG. 8, the intermediate flanges are denoted by reference numeral 73, and openings passing through the intermediate flanges are denoted by reference numeral 75. The installation of the intermediate flanges 73 in their position in the central hole 16 in the roll axle 11 is similar to that described in relation to FIG. 7, so that axial movements of the intermediate flanges 73 are prevented. Thus, also in the exemplifying embodiment of FIG. 8, in the radial bore formed into the bottom of the cylinder bores $14_1,14_2$, an intermediate pipe 76a is installed which locks the intermediate flanges 73 in their position at the same time. Further, the intermediate pipes 76a are sealed against the intermediate flanges by means of ring seals 74. Differing from the illustration of FIG. 7, in the exemplifying embodiment of FIG. 8 the changes in length arising from temperature are compensated for by means of the joint between the feed pipes $21_1, \ldots, 21_n$ and the intermediate flanges 73, which joint permits axial movement. In the exemplifying embodiment of FIG. 8, this has been accomplished so that, in each particular case, the joint between the feed pipe $21_1, \ldots, 21_n$ and the intermediate flange 73 is not rigid, but the feed pipe can move axially in relation to the intermediate flange 73. For this reason, the joints between the feed pipes $21_1, \ldots, 21_n$ and the intermediate flanges are sealed by means of O-ring seals 78.

Figure 9A:
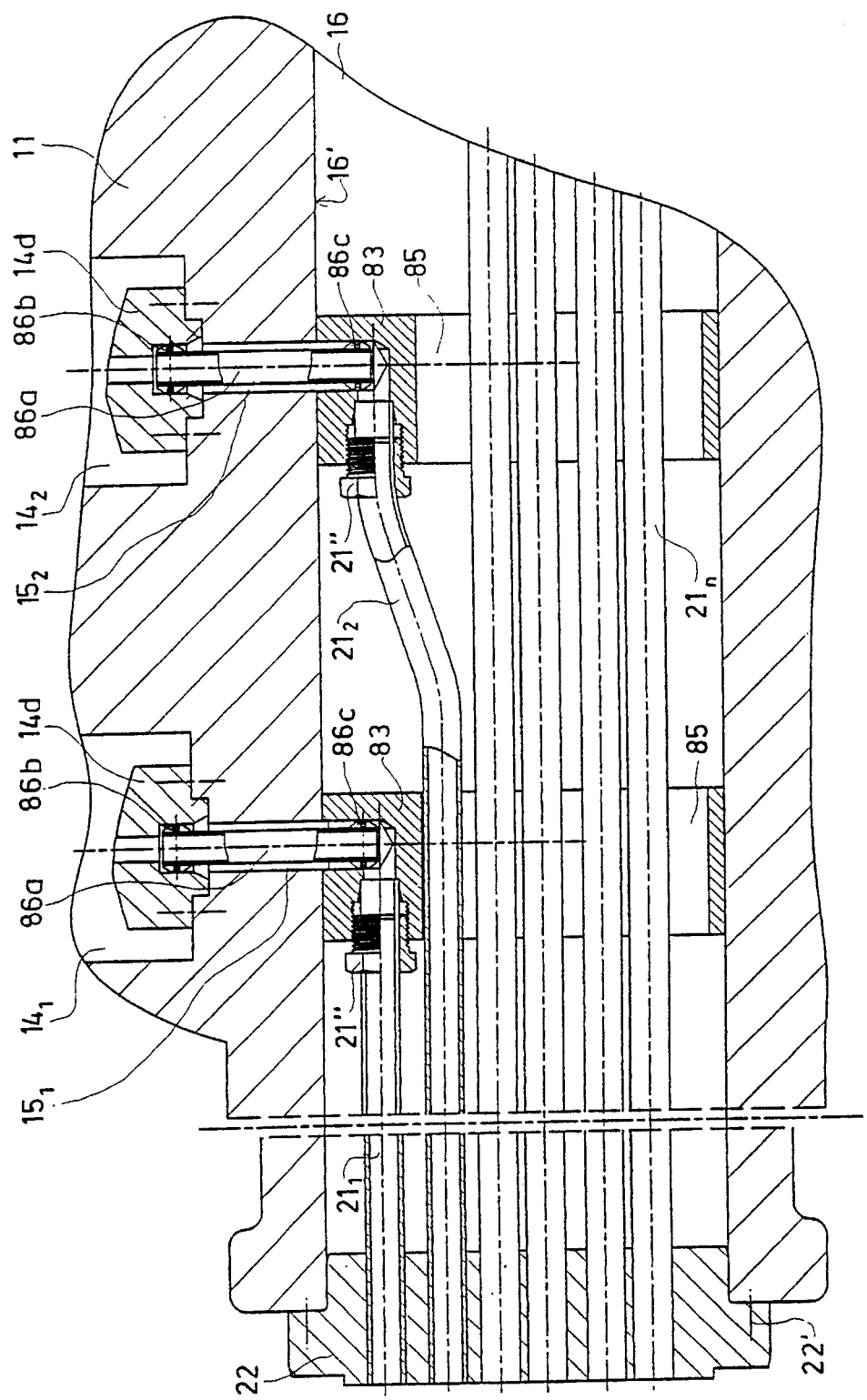
FIGS. 9A and 9B illustrate another embodiment of the oil feed system and of the distributor piece as illustrations, for example, corresponding to FIGS. 6A and 6B.
Figure 9B:
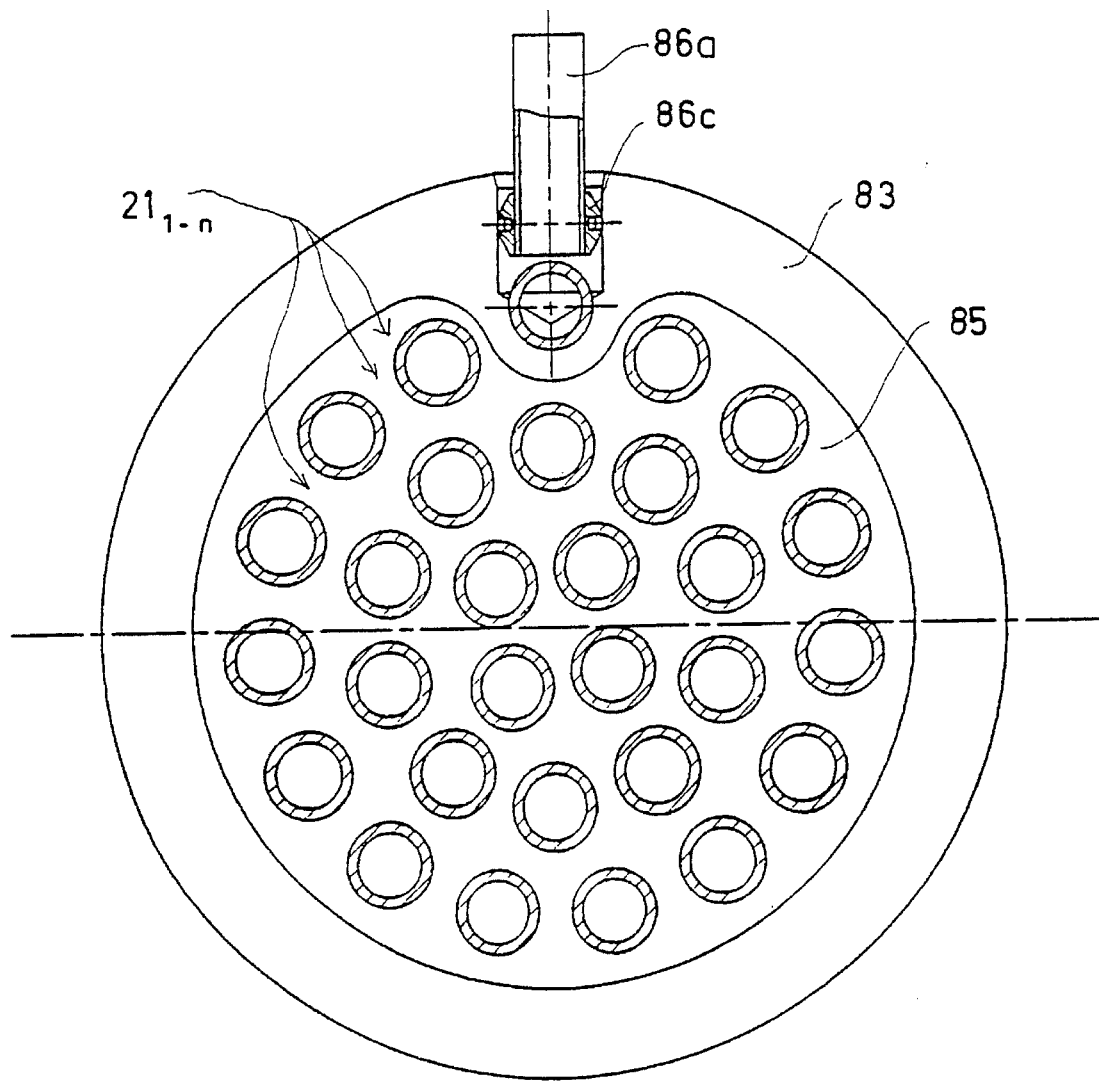

FIGS. 9A and 9B show a further embodiment of the present invention which is, in a way, a combination of the embodiments shown in FIGS. 6A, 6B and 7. The exemplifying embodiment that is being discussed now is similar to the embodiment of FIGS. 6A and 6B in the respect that into the cylinder bores $14_1, 14_2$, on the radial bores $15_1, 15_2$, on the bottom of the cylinder bores $14_1, 14_2$, a support piece $14d$ is installed, from which an intermediate pipe $86a$ is connected to the intermediate flange $83$ arranged in the central hole $16$ formed into the roll axle $11$. Further, in the present embodiment, it is a feature similar to FIGS. 6A and 6B that both the intermediate flange $83$ and the support piece $14d$ are provided with articulated joints $86b, 86c$, which are spherical joints in the embodiment of FIGS. 9A and 9B. These spherical joints $86b$ and $86c$ permit that changes in length in the feed pipes $21_1, \ldots, 21_n$, arising for example from temperature, can shift the intermediate flanges $83$ axially in the central hole $16$.

The embodiment now discussed is similar to FIG. 7 in the respect that the feed pipes $21_1, \ldots, 21_n$ are connected rigidly to the intermediate flanges $83$, which operate as distributor pieces, so that screw joints $21''$ are used in the joints between the feed pipes and the intermediate flanges $83$. In the other respects, the intermediate flange $83$ is similar to that shown in FIG. 7 so that, in the intermediate flange $83$, there is a large through opening $85$, through which the other feed pipes are passed through the intermediate flange $83$.

It is a feature common to all the embodiments that, in addition to the feed pipes $21_1, \ldots, _n$ in the central hole $16$ formed in the roll axle $11$, it is also possible to fit a return oil pipe or an equivalent duct as well as, in the case of a roll that is to be heated/cooled, a system of pipes for the heating/cooling fluid. Such pipes can be passed simply in the central hole through the openings in the intermediate flanges.

Above, the invention has been described by way of example with reference to the figures in the accompanying drawings. The invention is, however, not confined to the exemplifying embodiments illustrated in the figures alone, but these exemplifying embodiments can be modified in many ways and, for example, be combined with each other, so that different alternatives and embodiments of the invention may show variation within the scope of the inventive idea defined in the accompanying patent claims.

The examples provided above are not meant to be exclusive. Many other variations of the present invention would be obvious to those skilled in the art, and are contemplated to be within the scope of the appended claims.

We claim:

1. An oil feed system for a variable-crown roll, said roll comprising a stationary roll axle having cylinder bores in an outer surface thereof, a roll mantle revolvingly mounted on said axle, hydraulic loading elements situated in said cylinder bores of said roll axle and acting upon an inner face of the roll mantle to support the roll mantle on the roll axle, said roll axle having an axial through hole communicating with said cylinder bores and a plurality of oil feed pipes extending through said axial through hole through at least one end of said roll, a pressure fluid being passed through said oil feed pipes to said hydraulic loading elements, said system comprising:

a plurality of intermediate flanges, each intermediate flange arranged in said axial through hole in said roll axle at a location of a respective one of said loading elements and having a fluid passage therein, first means for connecting each of said oil feed pipes to the fluid passage in a respective one of said intermediate flanges, and second means for connecting the fluid passage in each of said intermediate flanges to a respective one of said cylinder bores such that the pressure fluid is passed from said respective oil feed pipes through the fluid passage of said respective intermediate flanges to said respective cylinder bores.

2. The oil feed system of claim 1, wherein the flow of pressure fluid to said loading elements is regulated individually.

3. The oil feed system of claim 1, wherein each of said intermediate flanges is substantially annular and has an axial through opening, said oil feed pipes being passable through said through openings of said intermediate flanges.

4. The oil feed system of claim 1, each intermediate flange further comprising sealing means for sealing an outer circumference of said intermediate flange against an inner wall of said axial through hole of said roll axle, said sealing means comprising two ring seals placed at an axial distance from one another, one end of the fluid passage leading from said intermediate flange to said cylinder bore being situated between said ring seals.

5. The oil feed system of claim 1, wherein said second connecting means comprises an intermediate pipe that extends from said intermediate flange to said cylinder bore, further comprising sealing means for sealing said intermediate pipe against said intermediate flange and said cylinder bore.

6. The oil feed system of claim 5, wherein said intermediate pipe is rigid.

7. The oil feed system of claim 5, wherein said intermediate pipe is resilient and permits axial movement of said intermediate flange.

8. The oil feed system of claim 5, further comprising articulated joint means for connecting said intermediate pipe to said intermediate flange and for connecting said intermediate pipe to said cylinder bore, said articulated joint means permitting axial movement of said intermediate flange.

9. The oil feed system of claim 1, wherein each of said oil feed pipes comprises a resilient member which permits axial movement of a respective one of said intermediate flanges.

10. The oil feed system of claim 1, wherein said first connecting means comprises an aperture in said intermediate flange, said oil feed pipe being movable within said aperture, further comprising sealing means for sealing said oil feed pipe against said aperture.

11. The oil feed system of claim 1, further comprising a support piece arranged in at least one of said cylinder bores, said support piece having an aperture therein, at least one of said second connecting means comprising an intermediate pipe that extends from the fluid passage in said intermediate flange into said aperture in said support piece.

12. The oil feed system of claim 1, further comprising a support piece arranged in at least one of said cylinder bores, said support piece having an aperture therein, at least one of said second connecting means comprising a flexible intermediate pipe that extends from the fluid passage in said intermediate flange into said aperture in said support piece.

13. The oil feed system of claim 1, further comprising a support piece arranged in at least one of said cylinder bores, said support piece having an aperture therein, at least one of said second connecting means comprising an intermediate pipe that extends from the fluid passage in said intermediate flange into said aperture in said support piece, first articulated joint means arranged in said intermediate flange for connecting said intermediate pipe to said intermediate flange, and second articulated joint means arranged in said support piece for connecting said intermediate pipe to said cylinder bore.

14. The oil feed system of claim 13, wherein said first and second articulated joint means comprise spherical joints.

15. The oil feed system of claim 1, wherein said first connecting means rigidly connects said oil feed pipe to the fluid passage in said intermediate flange, said second connecting means comprising an intermediate pipe, said intermediate pipe being substantially coextensive with the fluid passages in said intermediate flange to thereby prevent movement of said intermediate flange relative to said roll axle.

16. The oil feed system of claim 1, wherein said first connecting means comprise an aperture in said intermediate flange, said oil feed pipe being movable within said aperture, and sealed against said aperture, said second connecting means comprising an intermediate pipe, said intermediate pipe being substantially coextensive with said fluid passage in said intermediate flange to thereby prevent movement of said intermediate flange relative to said roll axle.

17. The oil feed system of claim 1, wherein said first connecting means rigidly connects said oil feed pipe to said fluid passage in said intermediate flange, further comprising a support piece arranged in at least one of said cylinder bores, said support piece having an aperture therein, at least one of said second connecting means comprising an intermediate pipe that extends from the fluid passage in said intermediate flange into said aperture in said support piece, first articulated joint means arranged in said intermediate flange for connecting said intermediate pipe to said intermediate flange, and second articulated joint means arranged in said support piece for connecting said intermediate pipe to said cylinder bore.

18. The oil feed system of claim 17, wherein said first and second articulated joint means comprise spherical joints.

19. The oil feed system of claim 1, wherein said roll axle comprises substantially radial bores for connecting said cylinder bores to said axial through hole of said roll axle.

\* \* \* \* \*